United States Patent
Sakita

(10) Patent No.: US 8,537,190 B2
(45) Date of Patent: Sep. 17, 2013

(54) IMAGE FORMING APPARATUS AND IMAGE FORMING METHOD

(75) Inventor: Tomoaki Sakita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 203 days.

(21) Appl. No.: 13/088,097

(22) Filed: Apr. 15, 2011

(65) Prior Publication Data

US 2012/0069120 A1    Mar. 22, 2012

(30) Foreign Application Priority Data

Sep. 17, 2010    (JP) ................................. 2010-209802

(51) Int. Cl.
| | |
|---|---|
| B41J 2/435 | (2006.01) |
| B41J 2/47 | (2006.01) |
| B41J 2/455 | (2006.01) |
| B41J 2/385 | (2006.01) |
| G01D 15/14 | (2006.01) |
| G03G 13/04 | (2006.01) |

(52) U.S. Cl.
USPC ........... 347/236; 347/237; 347/246; 347/247; 347/133

(58) Field of Classification Search
USPC .......................................... 347/236, 246, 133
See application file for complete search history.

(56) References Cited

U.S. PATENT DOCUMENTS 4,897,672 A * 1/1990 Horiuchi et al. .............. 347/236
6,466,594 B1 * 10/2002 Iwazaki ...................... 372/29.01

FOREIGN PATENT DOCUMENTS

| JP | 2002-131662 A | 5/2002 |
|---|---|---|
| JP | 2007-60569 A | 3/2007 |

* cited by examiner

*Primary Examiner* — Laura Martin
*Assistant Examiner* — Jeremy Bishop
(74) *Attorney, Agent, or Firm* — Sughrue Mion, PLLC

(57) ABSTRACT

An image forming apparatus including: a light scanning portion that lights a plurality of beams, and scans a surface to be scanned of an image carrier to form an electrostatic latent image; a detection portion that detects at least one lighted beam; an abnormality detection portion that transmits data to the light scanning portion via a transmission-line, causes the light scanning portion to light a beam, and detects abnormality of the transmission-line based on the detected beam; and a setting portion that sets a number of beams to be lighted in the case of the formation of the electrostatic latent image so that an amount of light of the detected beam in the case of abnormality detection of the transmission-line is equal to or more than a minimum amount of light of the detected beam in the case of the formation of the electrostatic latent image.

8 Claims, 7 Drawing Sheets

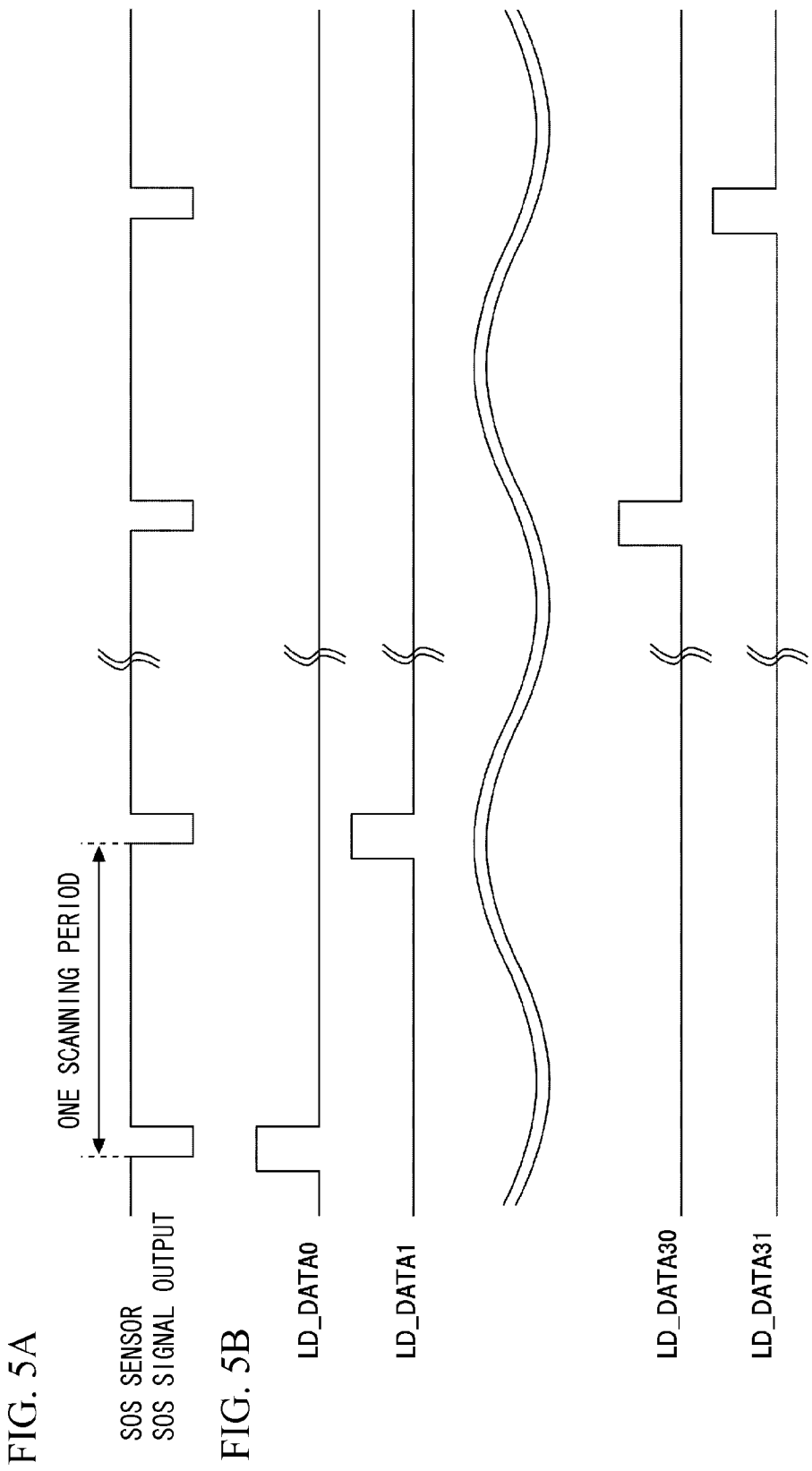

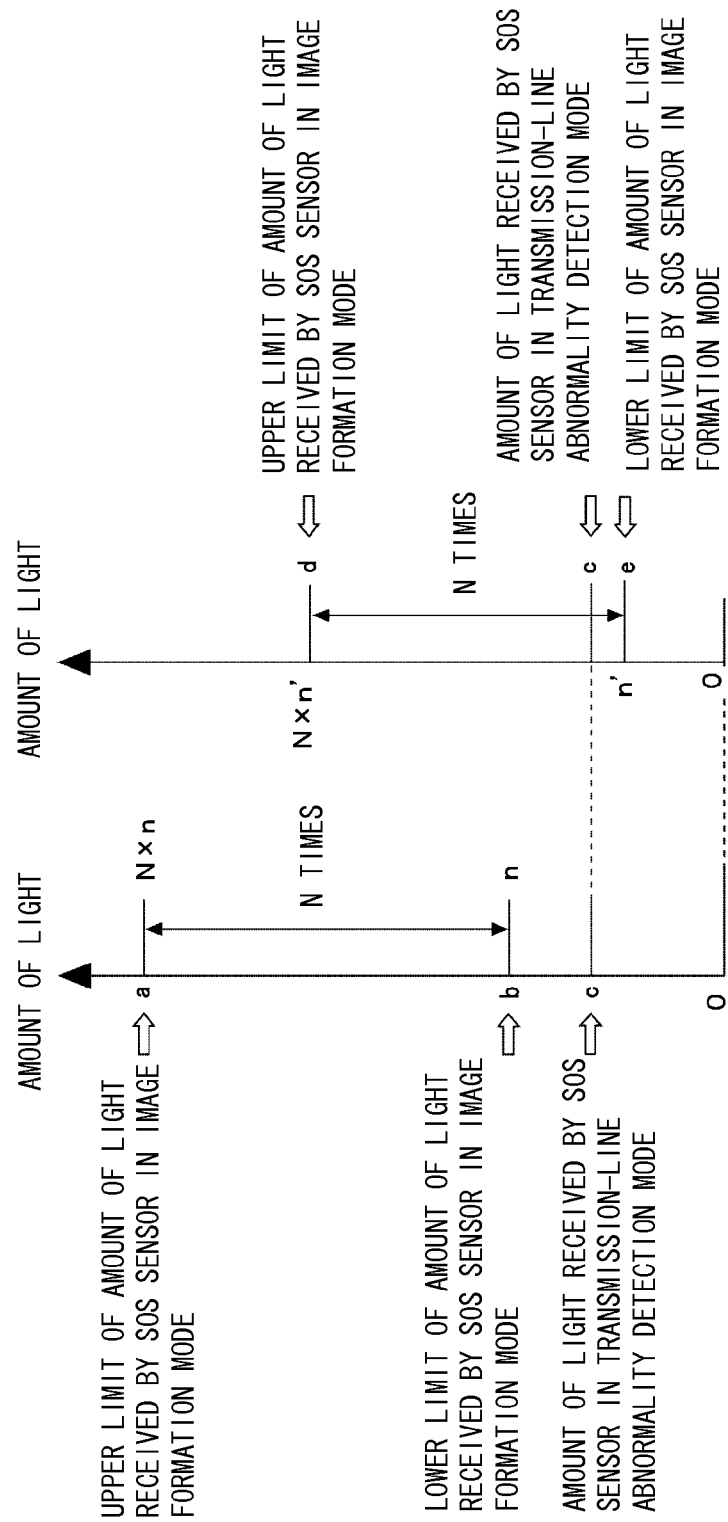

IMAGE FORMING APPARATUS AND IMAGE FORMING METHOD

CROSS-REFERENCE TO RELATED APPLICATION

This application is based on and claims priority under 35 USC 119 from Japanese Patent Application No. 2010-209802 filed on Sep. 17, 2010.

BACKGROUND (i) Technical Field

The present invention relates to an image forming apparatus and an image forming method.

(ii) Related Art

Conventionally, a surface emitting laser (hereinafter referred to as "VCSEL (Vertical Cavity Surface Emitting Laser)") is used as a light source of the light scanning apparatus. The VCSEL is useful as the light source having two or more luminous points. For example, when the number of laser beams become several dozen by using the VCSEL, an image can be written with a high resolution of 2400 dpi or more.

SUMMARY

According to an aspect of the present invention, there is provided an image forming apparatus including: a light scanning portion that lights a plurality of beams, and scans a surface to be scanned of an image carrier to form an electrostatic latent image; a detection portion that detects at least one beam lighted by the light scanning portion; an abnormality detection portion that transmits data to the light scanning portion via a transmission-line, causes the light scanning portion to light a beam, and detects abnormality of the transmission-line based on the beam detected by the detection portion; and a setting portion that sets a number of beams to be lighted by the light scanning portion in the case of the formation of the electrostatic latent image so that an amount of light of the beam detected by the detection portion in the case of abnormality detection of the transmission-line by the abnormality detection portion is equal to or more than a minimum amount of light of the beam detected by the detection portion in the case of the formation of the electrostatic latent image.

BRIEF DESCRIPTION OF THE DRAWINGS

Exemplary embodiments of the present invention will be described in detail based on the following figures, wherein:

FIG. 5A is a diagram illustrating a SOS (Start Of Scan) signal output from a SOS sensor in the case of a transmission-line abnormality detection process;

FIG. 5B is a diagram illustrating image data signals output to respective transmission channels for one scanning period of a main scanning direction;

FIG. 6A is a diagram illustrating a conventional amount of received light of the SOS sensor;

FIG. 6B is a diagram illustrating an amount of received light of the SOS sensor according to an exemplary embodiment;

DETAILED DESCRIPTION

A description will now be given of an exemplary embodiment with reference to the accompanying drawings.

A description will now be given of an exemplary embodiment in which the present invention is applied to a light scanning apparatus. The light scanning apparatus exposes and scans a photosensitive drum by plural laser beams.

Figure 1:
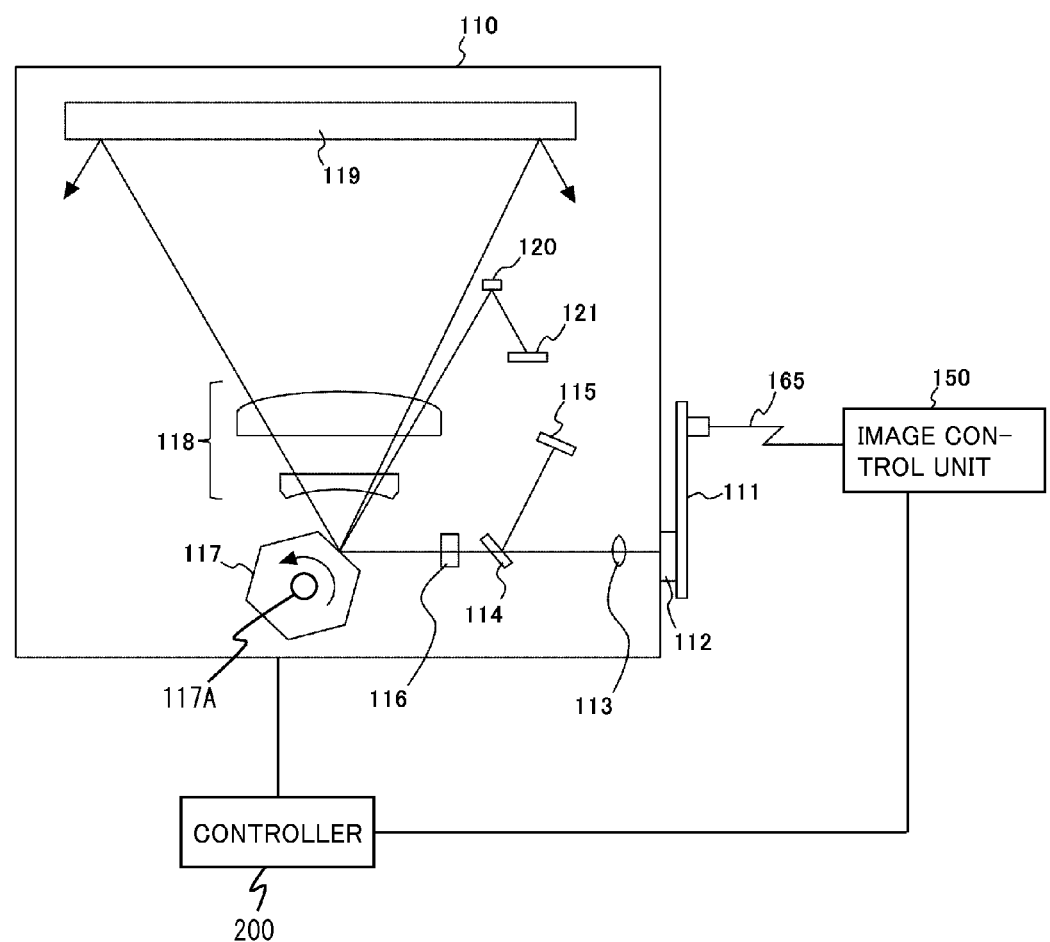
FIG. 1 is a diagram illustrating schematic configuration of a light scanning apparatus.

First, the configuration of a light scanning apparatus 110 is explained with reference to FIG. 1. FIG. 1 is a diagram illustrating schematic configuration of the light scanning apparatus 110. The light scanning apparatus 110 includes a laser array 112, a collimating lens 113, a half mirror 114, a monitoring photodiode (referred to hereinafter as "MPD") sensor 115, a cylindrical lens 116, a polygon mirror 117, a polygon motor 117A, a fθ lens 118, a cylindrical mirror 119, a pickup mirror 120, and a main scanning synchronous sensor (referred to hereinafter as "a SOS (Start Of Scan) sensor") 121. The laser array 112 is provided on a circuit board 111. An image control unit 150 is connected to the circuit board 111 via a transmission-line 165. The image control unit 150 is connected to a controller 200 in an image forming apparatus 100 described later.

Figure 2:
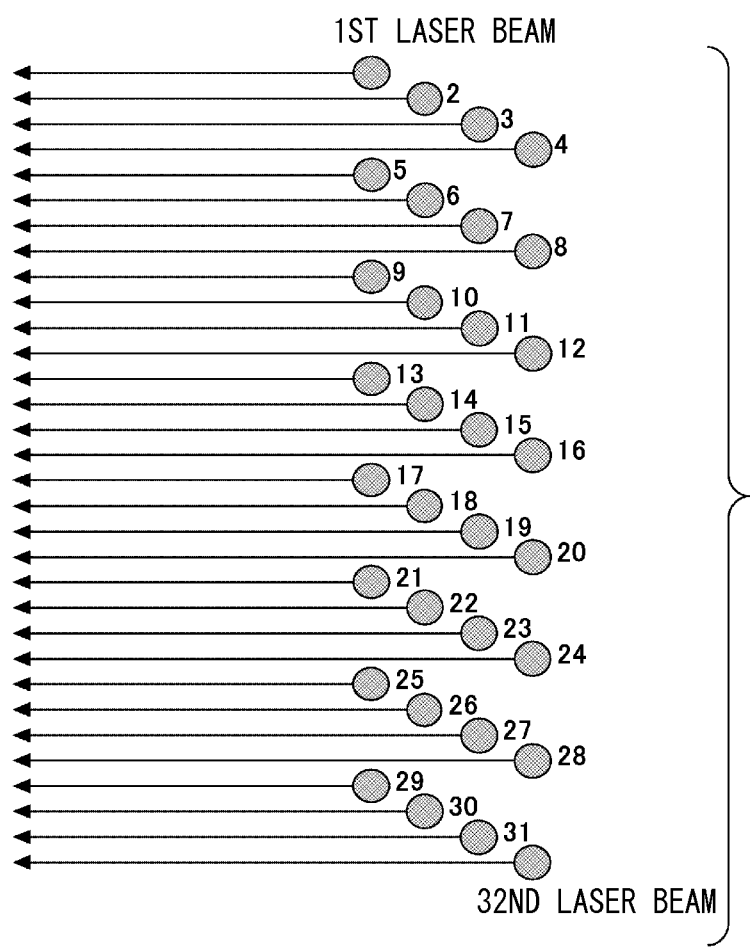
FIG. 2 is a diagram illustrating schematic configuration of a laser array.

The laser array 112 is a surface emitting type laser array that emits plural laser beams. The plane emission type laser array 112 can generate dozens of laser beams. The array of the laser beams is not limited to a single line, and the laser beams are arrayed in a two-dimensional shape. The laser array 112 is arrayed in the two-dimensional shape as illustrated in FIG. 2. In the exemplary embodiment, the number of laser diodes is 32. The laser diode is referred to hereinafter as "LD". In the following description, the laser diodes are referred to as "LD 1 to LD 32". The laser beams emitted from the respective LDs are referred to as "1st laser beam to 32nd laser beam". When the laser beams emitted from the LDs need not be distinguished from each other, they are simply written as the laser beams.

The laser beams emitted from the laser array 112 become substantially parallel light with the collimating lens 113. The half mirror 114 separates a part of the laser beams, and leads the separated laser beam to the MPD sensor 115. The laser array 112 differs from an edge emitting laser, and hence the laser array 112 cannot emit laser beams (i.e., back beams) from the rear side of a resonator. Therefore, to obtain a monitor signal for light amount control, the part of the laser beams is separated from the half mirror 114, and led to the MPD sensor 115. The MPD sensor 115 outputs a current (referred to hereinafter as a "monitor current") depending on an amount of light of the received laser beam. The monitor current output from the MPD sensor 115 is input to a laser driving unit 130 illustrated in FIG. 3.

On the other hand, the laser beams that have passed the half mirror 114 are changed to a long line image in the main scanning direction by the cylindrical lens 116, in the vicinity of reflection surfaces of the polygon mirror 117. The changed laser beams are transmitted to the polygon mirror 117.

The polygon mirror 117 is rotated by a polygon motor, not shown. The polygon mirror 117 deflects and reflects the incident laser beams to the main scanning direction. The deflected and reflected laser beams are focused on a photosensitive drum (not shown) by the fθ lens 118 to form an image in the main scanning direction while moving on the photosensitive drum at a constant speed. The laser beams that have passed the fθ lens 118 are focused on the photosensitive drum by the cylindrical mirror 119 to form an electrostatic latent image on the photosensitive drum according to an image data signal of a corresponding color.

The light scanning apparatus 110 needs to synchronize scanning start of each reflection surface of the polygon mirror 117 with data writing. Therefore, the light scanning apparatus 110 includes the pickup mirror 120 that reflects the laser beams before the scanning start, and the SOS sensor 121 that detects the laser beams reflected by the pickup mirror 120. The laser beams reflected by the pickup mirror 120 are input to the SOS sensor 121. The SOS sensor 121 transmits the SOS signal corresponding to the amount of light of the input laser beams to the image control unit 150. The image control unit 150 synchronizes writing timing of image data in the main scanning direction with the scanning start, based on the input SOS signal. The SOS signal is also used in the case of abnormality detection of the transmission-line as described later.

Figure 3:
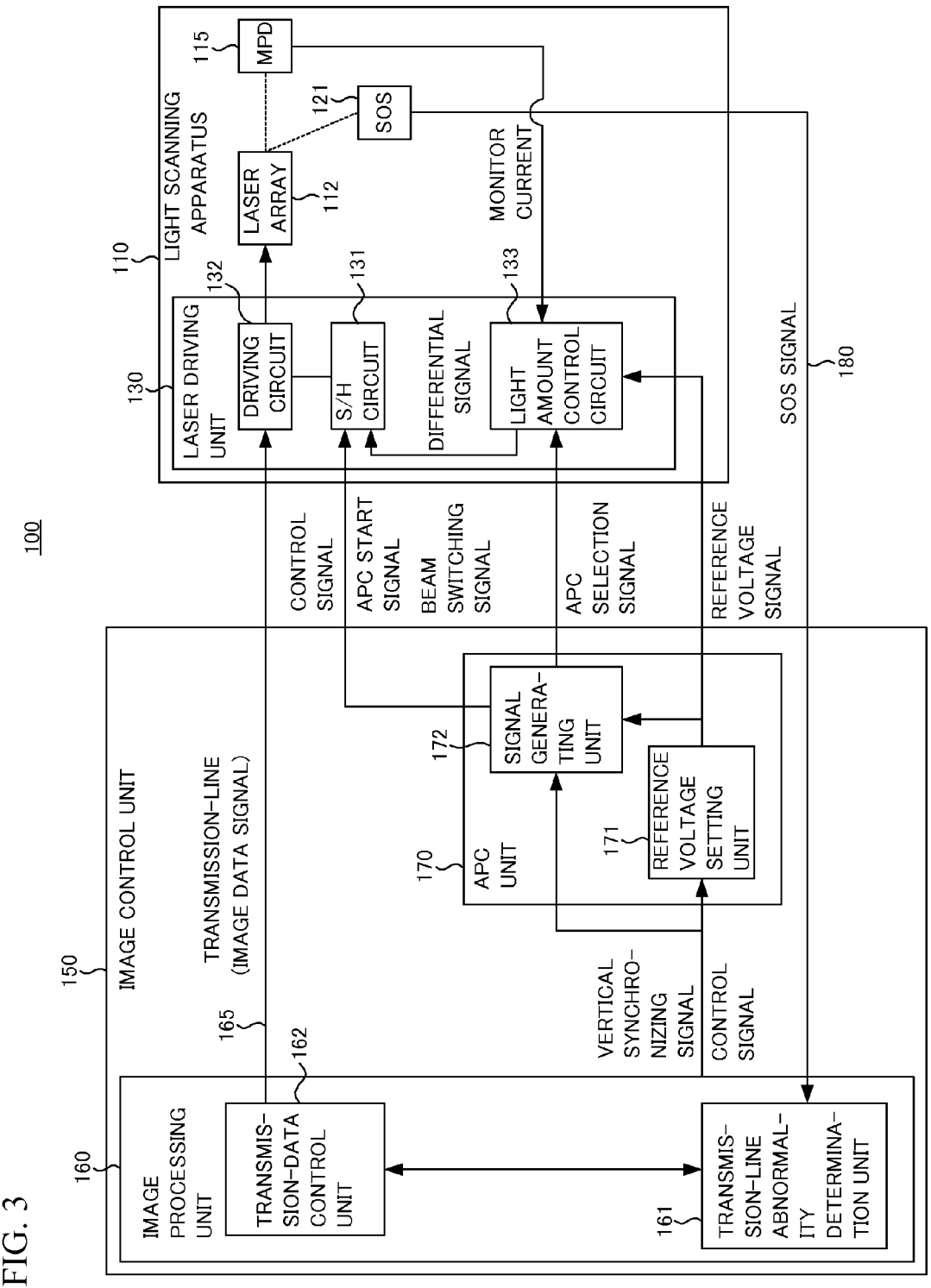
FIG. 3 is a diagram illustrating schematic configuration of an image forming apparatus.

Next, a description will now be given of the configuration of an image forming apparatus 100 including the light scanning apparatus 110 with reference to FIG. 3. The image forming apparatus 100 illustrated in FIG. 3 includes the image control unit 150 and the above-mentioned light scanning apparatus 110. The configuration of the light scanning apparatus 110 is described in FIG. 1 in detail, but it is simplified in FIG. 3. The light scanning apparatus 110 further includes a laser driving unit 130 that drives the laser array 112, in addition to the configuration of FIG. 1. The laser driving unit 130 is composed of electronic components mounted on the circuit board 111 illustrated in FIG. 1.

The image control unit 150 controls the whole operation of the image forming apparatus 100, and includes an image processing unit 160 and an APC (Auto Power Control) unit 170. The image control unit 150 of the present embodiment is formed by an ASIC (Application Specific Integrated Circuit).

The image processing unit 160 includes a transmission-line abnormality determination unit 161, and a transmission-data control unit 162. The transmission-line abnormality determination unit 161 and the transmission-data control unit 162 are connected to each other with a signal line. It should be noted that the image processing unit 160 includes a processing block other than the transmission-line abnormality determination unit 161 and the transmission-data control unit 162, but the processing block is not illustrated in the present embodiment. For example, the processing block that generates various control signals such as a reset signal and an image writing signal described later, and outputs the various control signals to the APC unit 170 is provided on the image processing unit 160.

The transmission-line abnormality determination unit 161 is connected to the SOS sensor 121 with a signal line 180, and receives the SOS signal output from the SOS sensor 121. The transmission-line abnormality determination unit 161 determines the abnormality of thirty-two transmission-lines 165 coupled between the transmission-data control unit 162 and a driving circuit 132 of the laser driving unit 130, based on the received SOS signal. When the transmission-line abnormality determination unit 161 determines that the abnormality occurs in at least one of thirty-two transmission-lines 165, the transmission-line abnormality determination unit 161 instructs the transmission-data control unit 162 to stop or cancel the output of the image data signal to the abnormal transmission-line 165. The transmission-line abnormality determination unit 161 notifies the controller 200 of the image forming apparatus 100 of the cancel of image forming operation (i.e., printing). The transmission-data control unit 162 stops or cancels the output of the image data signal to the abnormal transmission-line 165 according to the instruction from the transmission-line abnormality determination unit 161.

The transmission-data control unit 162 generates the image data signals turning respective LDs of the laser array 112 on or off, based on an image signal input from the outside (e.g. the controller 200 of the image forming apparatus 100). Then, the transmission-data control unit 162 transmits the generated image data signals to the driving circuit 132 of the laser driving unit 130 via the transmission-lines 165. The transmission-lines 165 are composed of thirty-two transmission-lines in conformity to the number of LDs of the laser array 112. That is, the transmission-lines 165 correspond to the LDs of the laser array 112 by one-on-one relationship, and each of the transmission-lines 165 transmits the image data signal turning corresponding LD on or off to the driving circuit 132 for the corresponding LD. In the following description, the image data signals turning respective LDs of the laser array 112 on or off are indicated as first to thirty-second image data signals.

The image processing unit 160 is connected to the SOS sensor 121 with the signal line 180, and receives the SOS signal transmitted from the SOS sensor 121. The image processing unit 160 outputs a vertical synchronizing signal and the various control signals such as the reset signal and the image writing signal to the APC unit 170, based on the SOS signal received from the SOS sensor 121.

The APC unit 170 includes a reference voltage setting unit 171 that indicates a setting value of a reference voltage depending on a target amount of light of the LDs, and a signal generating unit 172 that generates a control signal controlling the execution of the APC (Auto Power Control).

The reference voltage setting unit 171 is connected to the image processing unit 160 with a signal line, and receives the vertical synchronizing signal and the control signals transmitted from the image processing unit 160. The reference voltage setting unit 171 is connected to a light amount control circuit 133 of the laser driving unit 130 and the signal generating unit 172 of the APC unit 170 with signal lines.

The signal generating unit 172 is connected to the image processing unit 160, the reference voltage setting unit 171, the light amount control circuit 133, and a sample-hold circuit (referred to hereinafter as a "S/H circuit") 131 of the laser driving unit 130 with signal lines.

The reference voltage setting unit 171 outputs a reference voltage signal that indicates the setting value of the reference voltage to the laser driving unit 130, to the light amount control circuit 133 of the laser driving unit 130 based on the control signals input from the image processing unit 160. The signal generating unit 172 generates an APC (Auto Power Control) signal based on the control signals input from the image processing unit 160, and outputs the APC signal to the S/H circuit 131 of the laser driving unit 130. The APC signal includes an APC start signal that indicates the start of the APC, and a beam switching signal that indicates switching timing of the laser beams in which the light amount control is executed. The signal generating unit 172 generates an APC selection signal that indicates switching timing of initial APC and line APC in synchronization with the reference voltage signal, and outputs the APC selection signal to the light amount control circuit 133. The initial APC and the line APC are described later.

The laser driving unit 130 includes: the light amount control circuit 133 that executes the light amount control of each laser beam; the driving circuit 132 that outputs a laser driving signal based on the image data signal input from the image control unit 150; and the S/H circuit 131 that controls output timing of a differential signal from the light amount control circuit 133.

The light amount control circuit 133 generates the differential signal to obtain the target amount of light based on the monitor current input from the MPD sensor 115 of the light scanning apparatus 110, and outputs the differential signal to the S/H circuit 131. The S/H circuit 131 outputs the differential signal input from the light amount control circuit 133 to the driving circuit 132 in timing indicated by the APC start signal and the beam switching signal input from the signal generating unit 172.

The driving circuit 132 is connected to the transmission-data control unit 162 with thirty-two transmission-lines 165. When the driving circuit 132 inputs the image data signal transmitted from the transmission-data control unit 162 via any of the transmission-lines 165, the driving circuit 132 generates a laser driving current value corresponding to the laser driving signal, based on the input image data signal. The driving circuit 132 outputs to the laser array 112 the laser driving signal that turns on the LD of the laser array 112 corresponding to the transmission-lines 165 used for the transmission of the image data signal. The driving circuit 132 sets the laser driving current value to adjust the amount of light of the LD so that the level of the differential signal input from the S/H circuit 131 becomes "0" in the case of the light amount control, i.e., the amount of light of the LD to be controlled is identical with the target amount of light.

Figure 4:
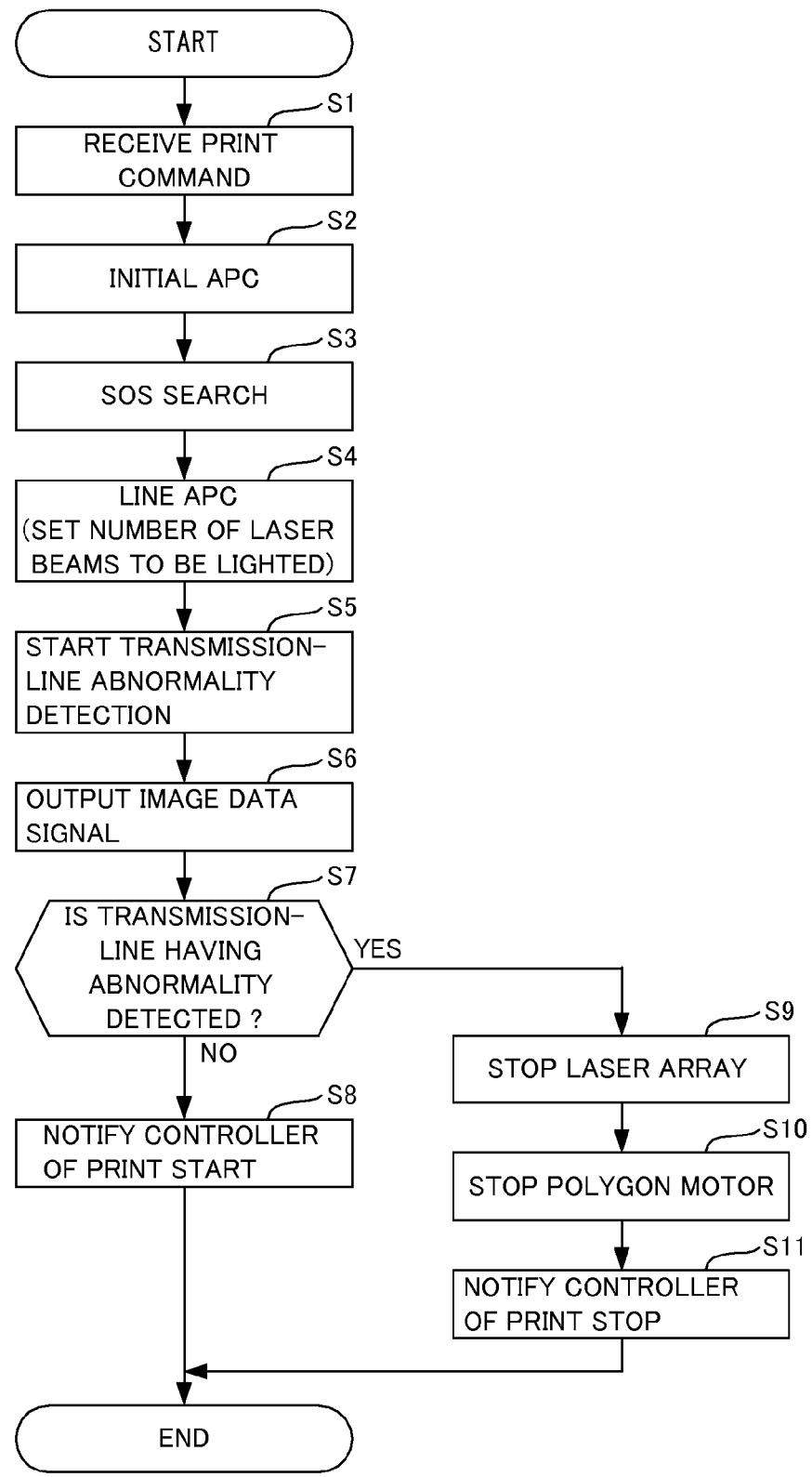
FIG. 4 is a flowchart illustrating process procedures of an image control unit.

Next, a description will now be given of process procedures of the APC control in the image control unit 150 with reference to a flowchart of FIG. 4. When the image control unit 150 receives a print command signal from a higher-level device (e.g. the controller 200 of the image forming apparatus 100) (step S1), the image control unit 150 starts the initial APC (step S2). The image control unit 150 repeatedly executes the initial APC a given number of times, and controls the laser array 112 so that the amount of light of each LD becomes a given amount of light corresponding to the reference voltage. The initial APC indicates that the image control unit 150 sequentially turns each of the LDs 1 to 32 on, and controls the laser array 112 so that the amount of light of each LD becomes the amount of light corresponding to the reference voltage (referred to hereinafter as "target amount of light"). In the initial APC, the image control unit 150 starts the control of the laser array 112 from a situation in which the LDs do not emit light at all, and hence the amount of light of each LD does not reach the target amount of light only by one control per each LD. Therefore, the image control unit 150 raises the amount of light of all LDs to a given value by repeating the same APC control two or more times.

Next, the image control unit 150 drives the laser array 112 to execute SOS search lighting (step S3). The SOS search lighting is executed for controlling scanning start timing of the photosensitive drum based on the SOS signal provided from the SOS sensor 121. Specifically, the image control unit 150 supplies the image data signal of main scanning lines to the driving circuit 132 in time with timing in which clocks corresponding to several pixels are counted after the SOS signal is supplied from the SOS sensor 121.

Next, the image control unit 150 shifts the initial APC to the line APC that is the light amount control for each line (step S4). In the line APC, the image control unit 150 sequentially turns each of the LDs 1 to 32 on, and sets the amount of light of each of the LDs 1 to 32, similarly to the initial APC. The line APC is executed in timing in which the photosensitive drum is not exposed for image writing. In the line APC, the transmission-data control unit 162 of the image control unit 150 sets the number of laser beams (or LDs) to be lighted in an image formation mode, as described later.

The image control unit 150 starts a transmission-line abnormality detection process for determining whether the abnormality occurs in at least one of the thirty-two transmission-lines 165 (step S5). In the transmission-line abnormality detection process, the transmission-data control unit 162 sequentially transmits the image data signal to each of the thirty-two transmission-lines 165 one by one, and causes the driving circuit 132 to turn a corresponding LD of the laser array 112 on. The SOS sensor 121 transmits the SOS signal corresponding to the amount of light of the lighted LD to the transmission-line abnormality determination unit 161 of the image processing unit 160. The transmission-line abnormality determination unit 161 detects the abnormality of each of the transmission-lines 165 based on the SOS signal transmitted from the SOS sensor 121. That is, the image control unit 150 sequentially outputs the image data signals to the thirty-two transmission-lines 165 one by one, and determines whether the corresponding LD of the laser array 112 turns on based on the SOS signal transmitted from the SOS sensor 121. When the image control unit 150 outputs the image data signals to one transmission-line 165 and confirms that the corresponding LD turns on, the image control unit 150 causes the driving circuit 132 to turn the corresponding LD off, transmits the image data signal to a subsequent transmission-line 165, and causes the driving circuit 132 to turn the LD corresponding to the subsequent transmission-line 165 on. When the corresponding LD turns on, it is clear that the image data signal is transmitted to the driving circuit 132 via the corresponding transmission-line 165. In this case, the image control unit 150 can determine that no abnormality occurs in the corresponding transmission-line 165. The transmission-line abnormality determination unit 161 detects the abnormality of the corresponding transmission-line 165 by determining whether each signal level of the SOS signal output from the SOS sensor 121 becomes the amount of light of the corresponding LD set by the line APC.

The abnormality determination of the transmission-lines 165 is executed one by one for each scanning period (i.e., one scanning period) of one line in the main scanning direction. FIGS. 5A and 5B illustrate a state of the abnormality determination of the transmission-lines 165. FIG. 5B illustrates a state where first to thirty-second image data signals (LD_DATA0-LD_DATA32) are sequentially output to the corresponding transmission-lines 165 for each scanning period. FIG. 5A illustrates the SOS signal output from the SOS sensor 121 that receives the laser beams emitted from the LDs driven by the image data signals.

The image control unit 150 outputs the image data signals to the respective thirty-two transmission-lines 165 in order (step S6). When all signal levels of the SOS signal output from the SOS sensor 121 become the amount of light of the respective corresponding LDs set by the line APC, the image control unit 150 determines that no abnormality occurs in all of the thirty-two transmission-lines 165 (NO in step S7). When the image control unit 150 determines that no abnormality occurs in all of the thirty-two transmission-lines 165, the image control unit 150 notifies the controller 200 of the image forming apparatus of the results of the determination, and starts printing operation (step S8). When the image control unit 150 determines that the abnormality occurs in at least one of the thirty-two transmission-lines 165 (YES in step S7), the image control unit 150 causes the driving circuit 132 to stop the laser array 112 (step S9) and causes the controller to stop the polygon motor 171A (step S10). The image control unit 150 notifies the controller 200 of the results of the determination, and causes the controller 200 to stop the printing operation (step S11).

When the image processing unit 160 in the image control unit 150 causes the driving circuit 132 to turn the laser array 112 on, and an image is formed on the photosensitive drum based on the image data signals (referred to hereinafter as "an image formation mode"), the image processing unit 160 causes the driving circuit 132 to turn the plural LDs of the laser array 112 on simultaneously, and the laser array 112 emits the plural laser beams on the photosensitive drum. However, when the abnormality of the transmission-lines 165 is detected (referred to hereinafter as "a transmission-line abnormality detection mode"), the image processing unit 160 causes the driving circuit 132 to sequentially turn each LD of the laser array 112 one-by-one on, and the transmission-line abnormality determination unit 161 determines whether the abnormality occurs in each of the transmission-lines 165 connected between the image control unit 150 and the driving circuit 132. Therefore, the amount of light of the laser beams received by the SOS sensor 121 in the image formation mode is widely different from that in the transmission-line abnormality detection mode. When the amount of light of the laser beams received by the SOS sensor 121 in the transmission-line abnormality detection mode is lower than a minimum amount of light of the laser beams received by the SOS sensor 121 in the image formation mode, the output of the SOS sensor 121 becomes an unstable state. It should be noted that the number of lighted LDs is the same as the number of lighted laser beams. A description will now be given of the amount of received light of the sensor 121 by using the number of lighted laser beams.

FIG. 6A illustrates the conventional amount of received light of the SOS sensor 121. It is assumed that the amount of received light of the SOS sensor 121 is "0" when the laser array 112 turns off. A point "a" in FIG. 6A indicates an upper limit (a maximum value) of the amount of received light of the laser beams received by the SOS sensor 121 in the image formation mode. A point "b" in FIG. 6A indicates a lower limit (a minimum value) of the amount of received light of the laser beams received by the SOS sensor 121 in the image formation mode. A symbol "N" in FIG. 6A indicates a dynamic range of the amount of emitted light of the laser array 112 (i.e., a ratio of a maximum value of the amount of emitted light of the laser array 112 to a minimum value thereof). A symbol "n" in FIG. 6A indicates the number of lighted laser beams. A point "c" in FIG. 6A indicates the amount of received light of the laser beams received by the SOS sensor 121 when the LDs of the laser array 112 are turned on one-by-one and the abnormality of the transmission-lines 165 is detected. In the transmission-line abnormality detection mode, each LD is turned on by using the amount of light controlled by the line APC.

As illustrated in FIG. 6A, the amount of received light of the SOS sensor 121 in the transmission-line abnormality detection mode is lower than the lower limit of the amount of received light of the SOS sensor 121 in the image formation mode. This is because the number of lighted laser beams in the transmission-line abnormality detection mode is "1", and differs from that in the image formation mode in which the plural laser beams are turned on. When the amount of received light of the SOS sensor 121 in the transmission-line abnormality detection mode is lower than the lower limit of the amount of received light of the SOS sensor 121 in the image formation mode, there is a case where the SOS signal output from the SOS sensor 121 becomes an unstable state. It is therefore desirable that the SOS sensor 121 is designed so that the amount of received light of the SOS sensor 121 in the transmission-line abnormality detection mode is included between the lower limit and the upper limit of the amount of received light of the SOS sensor 121 in the image formation mode.

FIG. 6B illustrates the amount of received light of the SOS sensor 121 according to the exemplary embodiment. In the exemplary embodiment, the transmission-data control unit 162 of the image control unit 150 controls the number of laser beams (or LDs) to be lighted in the image formation mode, so that the amount of received light of the SOS sensor 121 in the transmission-line abnormality detection mode is included between the lower limit and the upper limit of the amount of received light of the SOS sensor 121 in the image formation mode. More specifically, the transmission-data control unit 162 of the image control unit 150 controls the number of laser beams to be lighted of the laser array 112 in the image formation mode so that the amount of light of the laser beams detected by the SOS sensor 121 in the transmission-line abnormality detection mode is equal to or more than a minimum amount of light of the laser beams detected by the SOS sensor 121 in the image formation mode.

In the example of FIG. 6B, a point "d" indicates an upper limit (a maximum value) of the amount of received light of the SOS sensor 121 in the image formation mode. A point "e" indicates a lower limit (a minimum value) of the amount of received light of the SOS sensor 121 in the image formation mode. Although in the conventional example of FIG. 6A, the number of lighted laser beams is "n", the transmission-data control unit 162 changes the number "n" of laser beams to be lighted to "n'" in FIG. 6B. A point "c" in FIG. 6B indicates the amount of received light of the SOS sensor 121 in the transmission-line abnormality detection mode. In the transmission-line abnormality detection mode, the number of lighted laser beams of the laser array 112 is "1", and hence the amount of received light of the SOS sensor 121 in FIG. 6A (i.e., the point "c" in FIG. 6A) is the same as that in FIG. 6B (i.e., the point "c" in FIG. 6B).

In the exemplary embodiment, the transmission-data control unit 162 of the image control unit 150 adjusts the number of laser beams to be lighted in the image formation mode (i.e., changes "n" to "n'"), so that the amount of received light of the SOS sensor 121 in the transmission-line abnormality detection mode is included between the lower limit and the upper limit of the amount of received light of the SOS sensor 121 in the image formation mode. Specifically, the transmission-data control unit 162 of the image control unit 150 sets the number of laser beams to be lighted so as to satisfy the following expression (1):

$$n/N <= 1 \tag{1}$$

wherein "N" represents the dynamic range of the amount of emitted light of the laser beams, and "n" represents the number of laser beams to be lighted in the image formation mode.

Figures 7A, 7B:
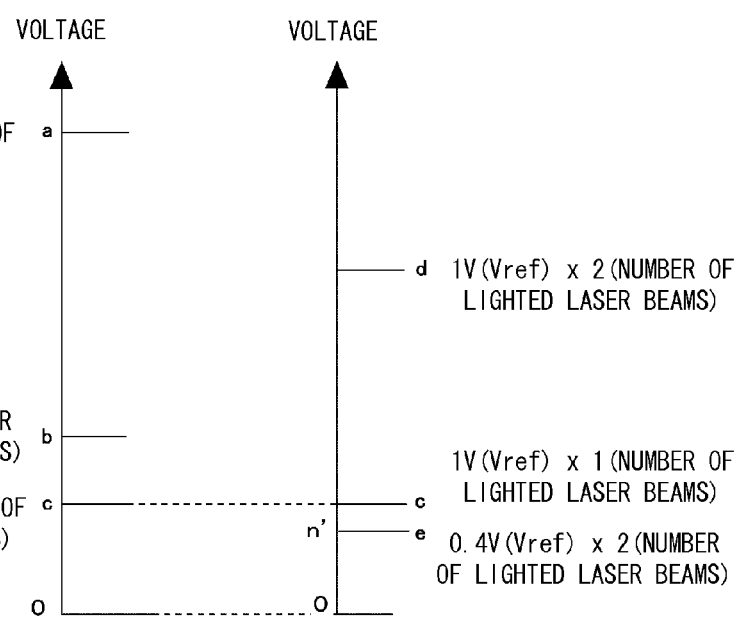
FIG. 7A is a diagram illustrating reference voltages of the laser array in the case of conventional image formation and conventional transmission-line abnormality detection.
FIG. 7B is a diagram illustrating reference voltages of the laser array in the case of image formation and transmission-line abnormality detection according to the exemplary embodiment.

The number of laser beams to be set will be more concretely described with reference to FIGS. 7A and 7B. FIG. 7A illustrates a conventional reference voltage of the laser array 112 in the image formation mode and the transmission-line abnormality detection mode. Since the amount of light of the laser beams of the LDs is proportional to the reference voltage to the target amount of light of the LDs, the reference voltage of the laser array 112 is used in FIGS. 7A and 7B on behalf of the amount of light of the laser beams of the LDs.

For example, it is assumed that a maximum value of the reference voltage for outputting the laser beams corresponding to the target amount of light from the LDs is 1 [v (volt)], and a minimum value of the reference voltage is 0.4 [v]. It is assumed that the number of lighted laser beams of the LDs in the image formation mode is 5. A maximum value of the amount of received light of the SOS sensor 121 in the image formation mode becomes an amount of light proportional to the reference voltage 1 [v]×5 (the number of lighted laser beams). A minimum value of the amount of received light of the SOS sensor 121 in the image formation mode becomes an amount of light proportional to the reference voltage 0.4 [v]×5 (the number of lighted laser beams). It is assumed that the reference voltage of the LDs in the transmission-line abnormality detection mode is 1 [v]. Since the number of lighted LDs is one in the transmission-line abnormality detection mode, the amount of received light of the SOS sensor 121 becomes an amount of light proportional to the reference voltage 1 [v]×1 (the number of lighted laser beams). Therefore, the amount of received light of the SOS sensor 121 in the transmission-line abnormality detection mode becomes less than the minimum value of the amount of received light of the SOS sensor 121 in the image formation mode.

FIG. 7B illustrates the reference voltage of the laser array 112 in the image formation mode and the transmission-line abnormality detection mode according to the exemplary embodiment. Similarly to the conventional example of FIG. 7A, it is assumed that a maximum value of the reference voltage for outputting the laser beams corresponding to the target amount of light from the LDs is 1 [v (volt)], and a minimum value of the reference voltage is 0.4 [v]. It is assumed that the reference voltage of the LDs in the transmission-line abnormality detection mode is 1 [v].

In FIG. 7B, the transmission-data control unit 162 changes the number of laser beams to be lighted in the image formation mode from "n" to "n'", so that the amount of received light of the SOS sensor 121 in the transmission-line abnormality detection mode is included between the lower limit and the upper limit of the amount of received light of the SOS sensor 121 in the image formation mode. In the example of FIG. 7A, the dynamic range "N" is 2.5. When the transmission-data control unit 162 selects the number "n'" of laser beams to be lighted so as to satisfy the above-mentioned expression (1), the transmission-data control unit 162 can selects "2" as the number "n'" of laser beams to be lighted. In this case, the maximum value of the amount of received light of the SOS sensor 121 in the image formation mode becomes an amount of light proportional to the reference voltage 1 [v]×2 (the number of lighted laser beams). The minimum value of the amount of received light of the SOS sensor 121 in the image formation mode becomes an amount of light proportional to the reference voltage 0.4 [v]×2 (the number of lighted laser beams). Further, the amount of received light of the SOS sensor 121 in the transmission-line abnormality detection mode becomes an amount of light proportional to the reference voltage 1 [v]×1 (the number of lighted laser beams). Therefore, the amount of received light of the SOS sensor 121 in the transmission-line abnormality detection mode can be included between the lower limit and the upper limit of the amount of received light of the SOS sensor 121 in the image formation mode, as illustrated in FIG. 7B.

As described above, according to the exemplary embodiment, the transmission-data control unit 162 sets the number of laser beams to be lighted of the laser array 112 in the image formation mode so that the amount of light of the laser beams detected by the SOS sensor 121 in the transmission-line abnormality detection mode is equal to or more than a minimum amount of light of the laser beams detected by the SOS sensor 121 in the image formation mode. Therefore, it is possible to make the SOS sensor 121 operate stably.

In the above-mentioned exemplary embodiment, when the transmission-line abnormality detection process is executed, the transmission-data control unit 162 outputs the image data signals to the respective thirty-two transmission-lines 165 in order, and the transmission-line abnormality determination unit 161 detects the abnormality of the transmission-lines 165 one-by-one. The transmission-line abnormality determination unit 161 may detect the abnormality of the transmission-lines 165 by plural lines such as a couple of lines.

In this case, the transmission-data control unit 162 transmits the image data signals to several transmission-lines. If no abnormality is detected in the several transmission-lines, the transmission-data control unit 162 changes the transmission-lines to be processed, and the abnormality detection is executed for several different transmission-lines. If abnormality is detected in the several transmission-lines to which the image data signals have been transmitted, the transmission-data control unit 162 again transmits the image data signal to each of the several transmission-lines in which the abnormality is detected, and the transmission-line abnormality determination unit 161 identifies at least one transmission-line in which the abnormality occurs, by the signal level of the SOS signal output from the sensor 121. When the image data signals are transmitted to the several transmission-lines, several laser beams are turned on simultaneously. Therefore, the amount of received light of the sensor 121 in the case of the transmission-line abnormality detection process comes close to the amount of received light of the sensor 121 in the image formation mode.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image forming apparatus comprising:
    a light scanning portion that lights a plurality of beam and scans a surface to be scanned of an image carrier to form an electrostatic latent image;
    a detection portion that detects at least one beam lighted by the light scanning portion;
    an abnormality detection portion that transmits data to the light scanning portion via a transmission-line, causes the light scanning portion to light one beam of the plurality of beams, and detects abnormality of the transmission-line based on the beam detected by the detection portion; and
    a setting portion that sets a number of beams to be lighted by the light scanning portion during the formation of the electrostatic latent image so that an amount of light of the beam detected by the detection portion during abnormality detection of the transmission-line by the abnormality detection portion is equal to or more than a minimum amount of light of the plurality of beams detected by the detection portion during the formation of the electrostatic latent image.

2. The image forming apparatus according to claim 1, wherein the setting portion sets the number of beams to be lighted so as to satisfy the following expression:

$$n/N <= 1$$

wherein "N" represents a ratio of the minimum amount of light of the plurality of beams emitted from the light scanning portion during image formation and a minimum amount of light of the plurality of beams emitted from the light scanning portion during image formation, and "n" represents the number of beams to be lighted by the light scanning portion in the case of the formation of the electrostatic latent image.

3. The image forming apparatus according to claim 1, wherein the abnormality detection portion outputs the data to a single transmission-line, causes the light scanning portion to light a beam, and detects the abnormality of the single transmission-line based on an amount of light of the beam detected by the detection portion.

4. The image forming apparatus according to claim 1, wherein the abnormality detection portion outputs a plurality of pieces of data to a plurality of transmission-lines respectively, causes the light scanning portion to light a plurality of beams, and detects the abnormality of the transmission-lines based on respective amounts of light of the beams detected by the detection portion.

5. The image forming apparatus according to claim 1, wherein the abnormality detection portion detects the abnormality of the transmission-line after the setting portion sets the number of beams to be lighted by the light scanning portion.

6. An image forming method comprising:
lighting a plurality of beams and scanning a surface of an image carrier to form an electrostatic latent image using a scanner;
detecting at least one beam lighted by the scanner;
transmitting data to the scanner via a transmission-line, causing the scanner to light a beam, and detecting abnormality of the transmission-line based on the detected beam; and
setting a number of beams to be lighted by the scanner in the case of the formation of the electrostatic latent image so that an amount of light of the detected beam in the case of abnormality detection of the transmission-line is equal to or more than a minimum amount of light of the detected beams in the case of the formation of the electrostatic latent image.

7. The image forming apparatus according to claim 1, wherein the setting portion sets the number of beams to be lighted by the light scanning portion during the formation of the electrostatic latent image so that the amount of light of the beam detected by the detection portion during abnormality detection of the transmission-line by the abnormality detection portion is between an upper limit and a lower limit of the amount of light of the plurality of beams detected by the detection portion during the formation of the electrostatic latent image.

8. The method according to claim 6, wherein the number of beams to be lighted by the scanner in the case of the formation of the electrostatic latent image is set so that an amount of light of the detected beam in the case of abnormality detection of the transmission-line is between and upper limit and a lower limit of the amount of light of the detected beams in the case of the formation of the electrostatic latent image.

* * * * *